United States Patent Office 3,446,659
Patented May 27, 1969

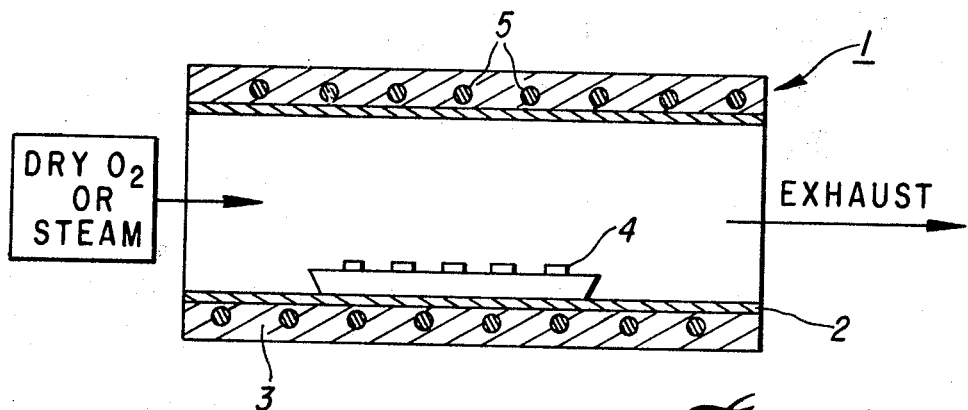
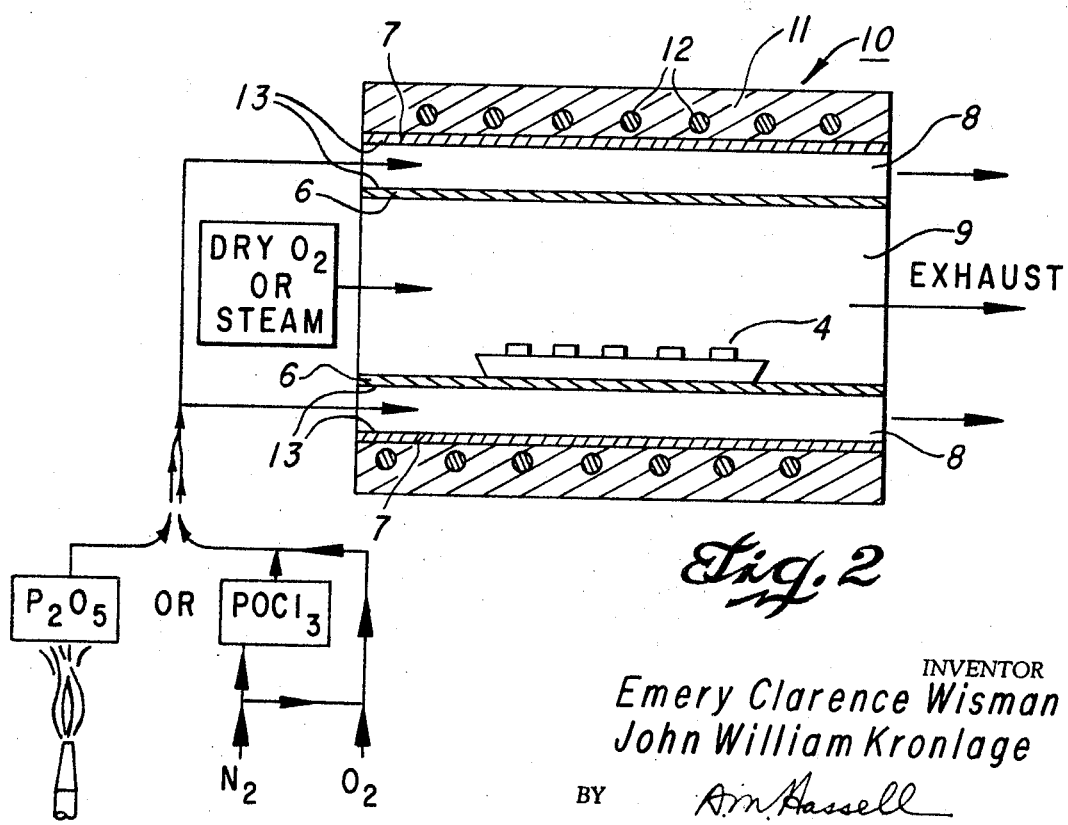

3,446,659
APPARATUS AND PROCESS FOR GROWING NONCONTAMINATED THERMAL OXIDE ON SILICON
Emery C. Wisman and John W. Kronlage, Richardson, Tex., assignors to Texas Instruments Incorporated, Dallas, Tex., a corporation of Delaware
Filed Sept. 16, 1966, Ser. No. 579,956
Int. Cl. B44d 1/00; H01b 1/04
U.S. Cl. 117—201               6 Claims This invention relates to semiconductor devices and more particularly to an apparatus and a process for forming a sodium free silicon oxide layer on a silicon substrate.

In the fabrication of planar semiconductor devices it is necessary to produce a protective layer of silicon oxide on the surface of a silicon substrate. One common method of forming the layer is by the conventional steam or dry oxygen thermal oxidation process. To form an oxide in this manner, a number of substrates, or wafers, are positioned on a suitable support located within a quartz tube enclosed within a refractory material of a conventional furnace. All the substrates are separated from one another and positioned to allow the flow of the oxidizing gas to pass over the desired surfaces of each substrate. By means of heating coils or rod, the substrates are raised to a temperature within the range of from about 900° C. to about 1200° C. An oxidizing gas such as steam or dry oxygen is allowed to flow through the quartz tube for a sufficient period of time, for example approximately three hours, to form the desired thickness of oxide.

However, conventional high temperature thermal oxidations of silicon substrates produce oxides which are heavily contaminated with mobile ions. Among these ions the most plentiful are those of sodium, a common contaminant existing in the form of sodium oxide $Na_2O$ in almost all common refractory ceramics used in furnace construction and in moderate quality glassware. Sodium oxide contamination is an easily recurring problem because of its rapid diffusion rate even at low temperatures and results in severe instability of a semiconductor device under load. Substrates oxidized by placement in a water vapor atmosphere in a contaminated furnace structure are prone to accept sodium by the transport phenomena $$2NaOSi + H_2O = Na_2O + 2HOSi$$

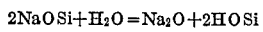

(represents sodium bound in quartz)  (represents hydrogen in quartz)

which causes the sodium ions bound in the quartz tube to be replaced by hydrogen. The sodium ions that have migrated from the refractory material of the furnace into the quartz tube are now replaced with the hydrogen from the oxidizing gas, and the sodium ions are then conveyed by the oxidizing gas to the surface of the substrates.

Therefore an object of this invention is to provide a process whereby sodium contamination free silicon oxide layers can be produced upon silicon semiconductor substrates.

Another object of the invention is to provide a process whereby sodium contaminants from the furnace itself are prevented from affecting the silicon oxide by providing a gettering material between the contaminant source and the silicon substrate.

A further object of the invention is to provide an apparatus for forming sodium contamination free thermal grown silicon oxide upon a silicon substrate.

The novel features believed to be characteristic of this invention are set forth in the appended claims. The invention itself, however, as well as other objects and advantages thereof, may best be understood by reference to the following detailed description of an illustrative embodiment, when read in conjunction with the appended claims and accompanying drawing wherein:

FIGURE 1 is a pictorial view partly in section of a part of a conventional furnace fabricated according to the prior art, utilizing a single quartz tube, and FIGURE 2 is a pictorial view, partly in section of a part of a double walled quartz tube furnace fabricated according to the present invention. Identical designations in the two figures refer to the same or equivalent apparatus, devices, or parts.

The objects, features and advantages of the invention are attained by the use of sodium gettering materials surrounding the oxidizing chamber. An outer chamber is formed by enclosing a quartz tube containing the substrate to be oxidized with a larger quartz tube. The chamber thus formed between the two tubes is filled with a sodium gettering phosphorus gas with the inside surface of this chamber being coated with a sodium gettering phosphorus glass. The use of the phosphorus gas and glass effectively getters any sodium contamination migrating from the ceramic insulation of the furnace and also getters sodium contamination from any source within the inner tube containing the substrate, such as contaminated wafers, boats or oxidizing gas. This process produces excellent results, in that the oxide-silicon interface characteristics are near the theoretical behavior of high purity silicon oxide.

Referring now to FIGURE 1 of the drawing, the conventional furnace 1 includes a single quartz tube 2 enclosed in the refractory ceramic material 3 within which are imbedded heating coils 5 to heat the furnace to the required temperature. The silicon slices 4 are placed within the quartz tube and heated to the desired temperature which is from about 900° C. to about 1200° C. Dry oxygen $O_2$ or steam is introduced at one end of the tube and allowed to traverse its length, thereby passing over the surfaces of the silicon slices 4. The high temperature of the furnace, coupled with the oxidizing gas, furnishes the oxidation conditions necessary to oxide the surfaces of the silicon slices 4 to the thickness that is necessary for fabricating planar silicon devices. As previously mentioned, the silicon oxide layers on the substrates 4 are subjected to sodium ion contamination from the refractory ceramic 3 of the furnace 1. Due to the high temperature involved in forming the silicon oxide and the high mobility of the sodium ions, the sodium ions easily leave the refractory ceramic 3, pass through the thin walled quartz tube 2, are picked up by the oxidizing gas, and deposited upon the surface of the silicon substrates 4 as the silicon oxide is formed.

The furnace 10 according to the invention and as shown in FIGURE 2, utilizes two quartz tubes 6 and 7 which form the outer chamber 8 and the inner chamber 9. The smaller diameter quartz tube 6 is centered by any suitable means within the larger diameter quartz tube 7, which, in turn, is enclosed within the refractory ceramic insulator 11 provided with heating coils 12 formed therewithin to heat the furnace 10. The coils may, of course, be located outside of and surrounding the ceramic insulation at the expense of an increase in the expenditure of power to heat the furnace to the appropriate temperature. There is thus provided an outer chamber 8 that separates the inner chamber 9 from the refractory ceramic material 11. A phosphorus silicate glass 13 is applied to the walls of the outer chamber 8.

To begin the process, a phosphorus compound in gaseous form is introduced at one end of the outer chamber 8 and exhausted at the opposite end at an appropriate rate of flow, for example, of 4 ft.³/hour. The phosphorus gas can be formed by many methods.

Two convenient methods of forming the desired phosphorous gas before its introduction into the intermediate chamber 8 are by heating solid phosphorous pentoxide $P_2O_5$ to a sufficient temperature to vaporize the solid, or by passing part of a stream of nitrogen through liquid phosphorous oxychloride $POCl_3$ followed by its recombination with the remainder of the nitrogen stream plus the addition of oxygen to form the phosphorous pentoxide gas $P_2O_5$. Since both processes are simple and straightforward, the apparatus for forming the phosphorous gas in each case is not fully illustrated but only indicated in FIGURE 2 to show that either method takes place outside the furnace 10. Silicon substrates 4 are placed within the inner chamber 9 in the manner as previously described in connection with FIGURE 1. As in the conventional method of forming silicon oxide upon a silicon substrate, dry oxygen or steam is introduced at one end of the inner chamber 9. The oxidizing gas is made to pass over the substrates 4 and exhausted at the opposite end of the inner chamber 9 while the furnace 10 is brought up to a temperature from about 900° C. to about 1200° C. by heating coils 12. The substrates are kept in the chamber at that temperature for a period of time, for example three hours, sufficient to form the desired thickness of contamination-free silicon oxide. The phosphorous silicate glass 13 which lines the outer chamber 8 removes sodium from the quartz tubing and any sodium introduced into the oxidizing chamber 9. As the phosphorous gas passes through the outer chamber 8 and out therefrom, sodium ions migrating from the refractory ceramic material 13 through the outer wall of quartz tube 7 will be gettered by the phosphorous gas and removed from the apparatus along with the exhausted gas. By the use of this method very high purity silicon oxide film can be formed upon the substrates 4 without the usual sodium contamination.

What is claimed is:

1. In a method of forming an oxide free of sodium contamination on a semiconductor substrate, the steps of:
    (a) oxidizing said substrate in a furnace by heating it in an oxidizing chamber contained within said furnace, said chamber containing an oxidizing atmosphere, and
    (b) separating said oxidizing chamber from the sodium-contaminated refractory insulating material of said furnace by a sodium gettering phosphorous gas whereby said gas getters sodium from both said insulating material and said oxidizing chamber.

2. In a method of forming an oxide free of sodium contamination on a semiconductor substrate, the steps of:
    (a) oxidizing said substrate in a furnace by heating it in an oxidizing chamber contained within said furnace, said chamber containing an oxidizing atmosphere, and
    (b) separating said oxidizing chamber from the sodium-contaminated refractory insulating material of said furnace by a sodium gettering phosphorous glass, whereby said glass getters sodium from both said insulating material and said oxidizing chamber.

3. In a method of forming an oxide free of sodium contamination on a semiconductor substrate the steps of:
    (a) oxidizing said substrate in a furnace by heating it in an oxidizing chamber contained within said furnace, said chamber containing an oxidizing atmosphere, and
    (b) separating said oxidizing chamber from the sodium-contaminated refractory insulating material by both a sodium gettering phosphorous gas and a sodium gettering phosphorous glass, whereby said gas and glass getters sodium from both said insulating material and said oxidizing chamber.

4. An apparatus for producing an oxide free of sodium contamination on a semiconductor substrate, comprising:
    (a) a first tube positioned within a second tube to form a chamber therebetween, each of said tubes having an inlet and an outlet,
    (b) a layer of sodium gettering material upon the outer surface of said first tube and the inner surface of said second tube, whereby said material getters sodium from said chamber and said first tube,
    (c) a heating means surrounding said second tube, and
    (d) a refractory insulating material enclosing said second tube, said heating means and said first tube, whereby a sodium gettering gas within said chamber getters sodium from said chamber and said first tube.

5. The apparatus described in claim 4 wherein said first and second tubes are quartz.

6. The apparatus described in claim 4 wherein said sodium gettering material is a phosphorous glass, and said sodium gettering gas is a phosphorous compound.

References Cited

UNITED STATES PATENTS

| | | | |
|---|---|---|---|
| 3,047,438 | 7/1962 | Marinace | 117—106 X |
| 3,139,362 | 6/1964 | D'Asaro et al. | 117—201 X |
| 3,346,414 | 10/1967 | Ellis et al. | 117—201 X |

ALFRED L. LEAVITT, *Primary Examiner.*

W. E. BALL, *Assistant Examiner.*

U.S. Cl. X.R.

117—106, 229; 118—48